United States Patent Office 3,309,605
Patented Mar. 14, 1967

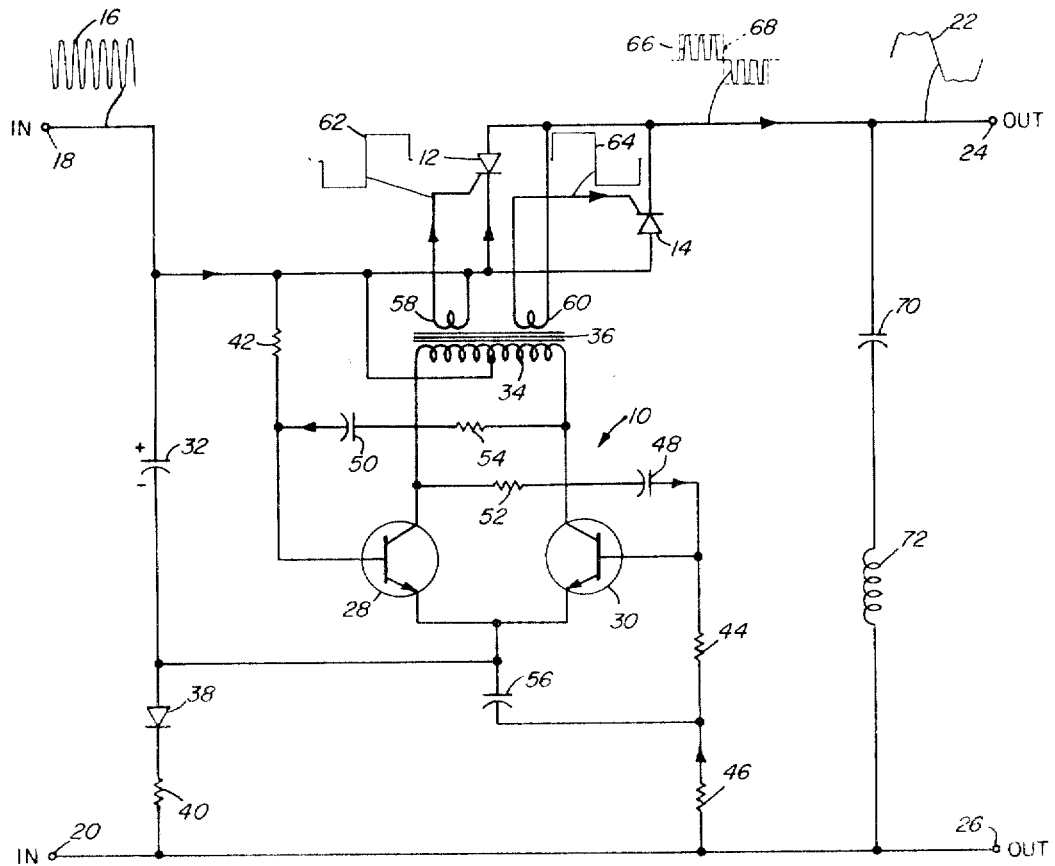

3,309,605
FREQUENCY CONVERTER WHEREIN AN ASTABLE OSCILLATOR IS FREE RUNNING AT HIGH FREQUENCY INPUT SIGNALS AND IS SYNCHRONIZED TO LOW FREQUENCY INPUT SIGNALS
El Don L. Hoven, Portland, Oreg., assignor to Tektronix, Inc., Beaverton, Oreg., a corporation of Oregon
Filed Aug. 19, 1963, Ser. No. 302,949
5 Claims. (Cl. 321—69)

The subject matter of the present invention relates generally to electrical circuits for changing the frequency of an electrical signal, and in particular to an A.C. frequency converter which changes a high frequency input signal to a low frequency output signal or transmits a low frequency input signal as a synchronized low frequency output signal of the same frequency.

Briefly, the frequency converter of the present invention employs an astable transistor oscillator to control the operation of a pair of trigger controlled rectifiers which act as gates to transmit a portion of the input line voltage applied thereto through such rectifiers to the output of the converter when such oscillator applies trigger signals of the proper polarity to such rectifiers. The astable oscillator is allowed to free run at a low frequency on the order of 60 cycles per second when such input line voltage has a high frequency in the range between 250 and 1,000 cycles per second so that the output line voltage transmitted through the rectifiers contains alternate, positive and negative groups of high frequency pulses. These groups of pulses vary from positive to negative at a low frequency rate of about 60 cycle per second and are filtered to produce a 60 c.p.s. output signal. Alternatively, when the input line voltage is of a low frequency in the range between 48 and 78 cycles per second, the oscillator is synchronized with the line voltage at this frequency so that the output line voltage transmitted from the rectifiers has the same frequency as such input line voltage.

The frequency converter of the present invention is especially useful in driving A.C. fan motors at input line voltages of different frequency than the rated frequency of such motors. Electrical instruments, such as cathode ray oscilloscopes, are usually air cooled with electric fans whose motors are designed for operation on the commercial power line frequency of 60 cycles per second. When line voltage of this frequency is not available it has heretofore been the practice to employ a full wave bridge rectifier circuit to convert the A.C. line voltage to a D.C. line voltage and to employ a D.C. fan motor. However, this modification of the oscilloscope is expensive and adds considerable weight. The frequency converter of the present invention has several advantages including a simple and inexpensive circuit which enables the use of conventional 60 c.p.s. fan motors with input line voltages of higher frequency which may be anywhere in the range of 250 to 1,000 cycles per second including the frequency of 400 c.p.s. conventionally employed in airplane and boat installations.

The present frequency converter is extremely efficient and may be used to operate any load consuming between 7 and 35 watts of power. This frequency converter has another advantage over conventional converters requiring external D.C. power supplies since it employs an input capacitor and rectifier to produce the D.C. supply voltage for the transistors of the oscillator employed in such converter by rectifying a portion of the input line current and employing such rectified current to charge the input capacitor. In addition, the present frequency converter also employs a bypass capacitor connected across the input of one of such transistors to transmit high frequency line voltages around such input so that the oscillator free runs and is synchronized only with low frequency line voltages. This enables the converter to transmit a 60 c.p.s. output voltage regardless of whether the input voltage is 400 c.p.s. or 60 c.p.s. without requiring any changes in the connections of the circuit.

It is therefore one object of the present invention to provide an improved frequency converter circuit which is simple in construction and efficient in operation.

Another object of the invention is to provide an improved A.C. frequency converter for changing a high frequency input line voltage to a lower frequency output line voltage over a wide range of input voltage frequencies.

A further object of the present invention is to provide an improved frequency converter circuit for converting either a high frequency or a low frequency input signal to a low frequency output signal by means of an astable oscillator which is allowed to free run at high frequency input signals and is synchronized to low frequency input signals.

An additional object of the present invention is to provide an improved frequency converter circuit of simple and reliable operation employing trigger controlled rectifiers as gating devices whose conductive condition is controlled by the output signal from an astable multivibrator.

Still another object of the present invention is to provide an improved A.C. frequency converter circuit requiring no external D.C. power supply in which an input capacitor and rectifier are employed to produce the D.C. supply voltage for the signal translating devices in an oscillator of such converter circuit by charging such input capacitor with rectified A.C. line current.

A still further object of the present invention is to provide an improved A.C. frequency converter circuit in which a bypass capacitor has connected across the input of one of a pair of transistors forming an astable multivibrator to prevent high frequency input line voltages from being applied to such one transistor so that such multivibrator free runs at such high frequencies, but is synchronized to the line voltage at low frequency input line voltages without any change in circuit connections.

Other objects and advantages will be apparent from the following detailed description of a preferred embodiment of the present invention and from the attached drawings of which:

The figure is a schematic diagram of one embodiment of the frequency converter circuit of the present invention.

One embodiment of the frequency converter of the present invention includes an astable multivibrator 10 whose output is connected to the control electrodes of a pair of trigger controlled gating devices 12 and 14 which may be silicon controlled rectifiers of the General Electric Company type C20B, for transmitting an input line voltage 16 applied between a pair of input terminals 18 and 20 through such rectifiers to produce an output line voltage 22 across a pair of output terminals 24 and 26. When the frequency of the input line voltage 16 is high compared to the free running frequency of multivibrator 10, the output line voltage 22 will be of a lower frequency than such input voltage and will be equal to the free running frequency of the multivibrator. However, when the frequency of the input line voltage line 16 is low and approximately equal to the free running frequency of the multivibrator 10, such multivibrator is synchronized to such input voltage so that the output voltage 22 is of the same frequency as such input voltage.

The astable multivibrator 10 includes a pair of transistors 28 and 30 which may be of the NPN type, such as Motorola type 151-103. The emitters of transistors 28 and 30 are connected together to the lower plate of an input capacitor 32 of about 50 microfarads and the collectors of such transistor are connected through the opposite sides of a center tapped primary winding 34 of a gating transformer 36 to the upper plate of the input capacitor 32. The input capacitor 32 is connected in series with a conventional rectifier or diode 38 and a charging resistor 40 of about 4.5 kilohms across the input terminals 18 and 20. The rectifier 38 allows only positive line current to flow from input terminal 18 through capacitor 32 and charging resistor 40 so that a positive D.C. supply voltage between 12.5 and 14 volts is produced across the input capacitor 32 having the polarity indicated. This D.C. voltage is applied across the emitter and collector of each of the transistors 28 and 30 to serve as the supply voltage for such transistors.

The base of transistor 28 is connected through a bias resistor 42 of about 110 kilohms to the upper plate of the input capacitor 32 in order to apply a D.C. bias voltage to such base electrode which is slightly positive with respect to its emitter voltage so that such transistor is normally conducting. In a similar manner, the base electrode of transistor 30 is connected through a pair of series connected bias resistors 44 and 46 of about 56 kilohms each to one end of the charging resistor 40. However, transistor 30 is normally non-conducting and is rendered conducting only by a positive line voltage at input terminal 20 so that the transistor is rendered alternately conducting and non-conducting by such line voltage. The base of each of the transistors 28 and 30 is also connected through coupling capacitors 48 and 50, respectively, of about 1.2 microfarads each and current limiter resistors 52 and 54, respectively, of about 3.3 kilohms to the collector of the other transistor. Thus, the output signals produced on the collectors of the transistors are transmitted through the coupling capacitors to the base of the other transistor which then inverts such signal and applies it as a positive feed back signal back to the base of the original transistor thereby causing the multivibrator to oscillate in an astable manner.

The input line voltage 16 is applied across bias resistors 42, 44 and 46 to the bases of transistors 28 and 30 to synchronize the oscillation of the astable multivibrator 10 to the frequency of the input line voltage for low frequency line voltages between 48 and 78 cycles per seconds. However, a bypass capacitor 56, of about 0.033 microfarads, is connected across the input of transistor 30 between the common connection of resistors 44 and 46 and the emitter of such transistor. This bypass capacitor 56 transmits high frequency line voltages between 250 and 1,000 cycles per second around the input of transistor 30 so that high frequency line voltages are prevented from reaching the base of such transistor 30 and the multivibrator 10 free runs at a frequency in the neighborhood of 60 to 65 cycles per second. Thus, when the input line voltage 16 has a frequency between 250 and 1,000 c.p.s. the impedance of the bypass capacitor 56 is low compared to the impedance of bias resistor 44 so that insufficient line voltage is applied to the base of transistor 30 to cause synchronization of the multivibrator with the line frequency. However, when the frequency of the input line voltage 16 is in the range of 48 to 78 cycles per second the impedance of a bypass capacitor 56 is large compared to the bias resistor 44 so that enough line voltage reaches the base of transistor 30 to cause synchronism of the multivibrator.

The output signal of the multivibrator 10 produced across the primary winding 34 is coupled to a pair of secondary windings 58 and 60 on the transformer 36.

One terminal of each of the secondary windings 58 and 60 is connected to the cathode of silicon controlled rectifiers 12 and 14, respectively, while the other terminal each of such secondary windings is connected to the trigger electrode of the same rectifier. Thus, the voltage induced in each of the secondary windings 58 and 60 by the output signal of the multivibrator is applied as a gating signal 62 and 64, respectively, across the trigger electrode and cathode of the silicon control rectifiers. It should be noted that the gating signals 62 and 64 are 180 degrees out of phase because such secondary windings are located on opposite sides of the center tap on primary winding 34. This means that the silicon control rectifiers 12 and 14 are alternatively conducting and non-conducting because only a positive gating signal applied to the trigger electrode of the rectifiers renders such rectifier conducting. The negative gating signal simultaneously applied to the trigger electrode of the other silicon controlled rectifier renders such rectifier non-conducting. As a result, the input line voltage 16 is transmitted through the silicon controlled rectifiers as a chopped signal 66 consisting of groups of pulses having a frequency equal to that of the input line voltage. The polarity of such groups of pulses changes alternatively from positive to negative at the frequency rate of the gating signals 62 and 64 as indicated by the dashed line 68 adjacent such chopped signal. When the frequency of the input line voltage 16 is about 400 cycles per second there are approximately 3 positive pulses in one group and 3 negative pulses in the next successive group forming the chopped signal 66.

The chopped signal 66 may be transmitted through a filter network including an output capacitor 70 of about 0.5 microfarad connected in series with an output inductor 72 of about 100 millihenries between output terminals 24 and 26. This filter smoothes the voltage pulses of the chopped signal 66 into the output line voltage which has a frequency equal to that of the gating signals 62 and 64. The frequency of the multivibrator 10 which is free running under the conditions shown in FIG. 1, is 60 cycles per second so that the output voltage 22 is also of this frequency. Thus, the output terminals 24 and 26 are connected across an 60 c.p.s. A.C. fan motor (not shown) in order to operate such fan motor by the output voltage 22 regardless of any variations in the frequency of the input line voltage 60 over a wide range.

It will be obvious to those having ordinary skill in the art that many changes may be made in the details of the above described preferred embodiment of the present invention without departing from the spirit of the invention. For example, transistors 28 and 30 may be replaced by vacuum tubes and the values of the various circuit components may be changed accordingly. Therefore, the scope of the present invention should only be determined by the following claims.

I claim:
1. A frequency converter circuit comprising:
   a pair of trigger controlled semiconductor gating devices having anode, cathode and trigger electrodes, connected in parallel with the cathode of one gating device connected to the anode of the other gating device;
   input means connected to one of the common connections at the anode and cathode of said gating devices to apply an A.C. input signal thereto;
   an astable oscillator connected to apply gating signals of opposite polarity to the trigger electrodes of said gating devices so that said gating devices conduct and successively transmit positive portions and negative portions of said input signal;
   coupling means for applying said input signal to said oscillator to synchronize said oscillator with said input signal when said input signal is within a predetermined frequency range, and for bypassing said input signal away from said oscillator at higher fre- quencies to allow said oscillator to free run when said input signal is outside of said frequency range; and output means including a filter connected to the other common connection at the anode and cathode of said gating devices to change said positive and negative portions into an A.C. output signal therefrom whose frequency is determined by the oscillation of the frequency of said oscillator.

2. A frequency converter circuit, comprising:

a pair of trigger controlled rectifiers having anode, cathode and trigger electrodes connected in parallel with the cathode of one rectifier connected to the anode of the other rectifier;

input means connected to one of the common connections at the anode and cathode of said rectifiers to apply an input line voltage thereto;

a pair of signal translating devices connected together as an astable multivibrator with the outputs of said devices connected to a different one of the trigger electrodes of said rectifiers;

coupling means for applying said input line voltage to said devices in order to synchronize the oscillations of said multivibrator at a predetermined frequency when said input line voltage is below an upper limit frequency, and to allow said multivibrator to free run when said input line voltage is above a lower limit frequency; and output means connected to the other common connection at the anode and cathode of said rectifiers to transmit an output line voltage therefrom whose frequency is determined by the oscillation frequency of said multivibrator.

3. An A.C. frequency converter circuit, comprising:

a pair of trigger controlled rectifiers having anode, cathode and trigger electrodes connected in parallel with the cathode of one rectifier connected to the anode of the other rectifier;

input means connected to one of the common connections at the anode and cathode of said rectifiers to apply an input line voltage thereto;

a pair of transistors connected together as an astable multivibrator with the outputs of said transistors connected to a different one of the trigger electrodes of said rectifiers;

coupling means including a capacitor, for applying said input line voltage to said transistors in order to synchronize the oscillations of said multivibrator at a predetermined frequency when said input line voltage is below an upper limit frequency, and to allow said multivibrator to free run when said input line voltage is above a lower limit frequency determined by said capacitor; and output means connected to the other common connection at the anode and cathode of said rectifiers to transmit an output line voltage therefrom whose frequency is determined by the oscillation frequency of said multivibrator.

4. An A.C. frequency converter circuit, comprising:

a pair of trigger controlled rectifiers having anode, cathode and trigger electrodes connected in parallel with the cathode of one rectifier connected to the anode of the other rectifier;

input means connected to one of the common connections at the anode and cathode of said rectifiers to apply an input line voltage thereto;

a pair of transistors connected together as an astable multivibrator;

a transformer having a center tapped primary winding connected at its opposite ends to the outputs of said transistors with the center tap of said primary winding connected to said input means, and a pair of secondary windings each connected to a different one of the trigger electrodes of said rectifiers;

coupling means including a bypass capacitor connected across the input of one of said transistors, for applying said input line voltage to said transistors in order to synchronize the oscillations of said multivibrator at a predetermined frequency when said input line voltage is below an upper limit frequency, and to allow said multivibrator to free run when said input line voltage is above a lower limit frequency determined by said bypass capacitor; and output means connected to the other common connection at the anode and cathode of said rectifiers to transmit an output line voltage therefrom whose frequency is determined by the oscillation frequency of said multivibrator.

5. An A.C. frequency converter circuit, comprising:

a pair of trigger controlled rectifiers having anode, cathode and trigger electrodes connected in parallel with the cathode of one rectifier connected to the anode of the other rectifier;

input means including a shunt capacitor connected to a diode and a resistor to provide a source of D.C. supply voltage, said input means being connected to one of the common connections at the anode and cathode of said rectifiers to apply an input line voltage thereto;

a pair of transistors connected as common emitter amplifiers with their emitter to collector circuits connected across said shunt capacitor, each of said transistor to form an astable multivibrator;

a transformer having a center tapped primary winding connected at its opposite ends to the outputs of said transistors with the center tap of said primary winding connected to said input means, and a pair of secondary windings each connected to a different one of the trigger electrodes of said rectifiers;

coupling means including a bypass capacitor connected across the input of one of said transistors, for applying said input line voltage to said transistors in order to synchronize the oscillations of said multivibrator at a predetermined frequency when said input line voltage is below an upper limit frequency, and to allow said multivibrator to free run when said input line voltage is above a lower limit frequency determined by said bypass capacitor; and output means connected to the other common connectio at the anode and cathode of said rectifiers to transmit an output line voltage therefrom whose frequency is determined by the oscillation frequency of said multivibrator.

References Cited by the Examiner

UNITED STATES PATENTS

| 2,905,880 | 9/1959 | Hess | 321—66 X |
| 3,211,985 | 10/1965 | Torok | 321—18 |
| 3,243,711 | 3/1966 | King et al. | 323—22 |
| 3,245,003 | 4/1966 | Chomicki | 331—113 |

JOHN F. COUCH, *Examiner.*

G. GOLDBERG, *Assistant Examiner.*

UNITED STATES PATENT OFFICE
CERTIFICATE OF CORRECTION

Patent No. 3,309,605                         March 14, 1967

El Don L. Hoven

It is hereby certified that error appears in the above numbered patent requiring correction and that the said Letters Patent should read as corrected below.

Column 1, line 33, for "cycle" read -- cycles --; column 3, line 52, for "seconds" read -- second --; column 6, line 36, after "said", second occurrence, insert -- transistors having its collector connected to the base of the other --.

Signed and sealed this 7th day of November 1967.

(SEAL)
Attest:

Edward M. Fletcher, Jr.                       EDWARD J. BRENNER

Attesting Officer                              Commissioner of Patents